United States Patent
Ribour et al.

(10) Patent No.: US 8,138,112 B2
(45) Date of Patent: *Mar. 20, 2012

(54) CONTROLLED DISTRIBUTION OF ACTIVE SITES IN ZIEGLER-NATTA CATALYST SYSTEMS

(75) Inventors: David Ribour, Mons (BE); Roger Spitz, Lyons (FR); Jerome Gromada, Waterloo (BE); Christophe Boisson, Tramoyes (FR)

(73) Assignees: Total Petrochemicals Research Feluy, Seneffe (Feluy) (BE); Centre National de la Recherche Scientifique (CNRS), Paris (FR)

( * ) Notice: Subject to any disclaimer, the term of this patent is extended or adjusted under 35 U.S.C. 154(b) by 207 days.

This patent is subject to a terminal disclaimer.

(21) Appl. No.: 12/296,957

(22) PCT Filed: Apr. 4, 2007

(86) PCT No.: PCT/EP2007/053289
§ 371 (c)(1),
(2), (4) Date: Oct. 8, 2009

(87) PCT Pub. No.: WO2007/115993
PCT Pub. Date: Oct. 18, 2007

(65) Prior Publication Data
US 2010/0029468 A1  Feb. 4, 2010

(30) Foreign Application Priority Data

Apr. 12, 2006  (EP) ..................................... 06290629

(51) Int. Cl.
*B01J 31/14* (2006.01)

(52) U.S. Cl. ....................................... 502/104; 502/118

(58) Field of Classification Search ........................ None
See application file for complete search history.

(56) References Cited

U.S. PATENT DOCUMENTS

| | | | |
|---|---|---|---|
| 4,379,758 A | 4/1983 | Wagner | |
| 5,019,633 A | 5/1991 | Wagner | |
| 7,851,395 B2 * | 12/2010 | Ribour et al. | 502/107 |

FOREIGN PATENT DOCUMENTS

| | | | |
|---|---|---|---|
| EP | 0193280 | * | 9/1986 |
| EP | 0193280 A2 | | 9/1986 |

* cited by examiner

*Primary Examiner* — Melvin Mayes
*Assistant Examiner* — Yun Qian

(57) ABSTRACT

The present invention provides a method for improving and controlling the activity of Ziegler-Natta catalyst systems.

8 Claims, 2 Drawing Sheets

CONTROLLED DISTRIBUTION OF ACTIVE SITES IN ZIEGLER-NATTA CATALYST SYSTEMS

CROSS-REFERENCE TO RELATED APPLICATIONS

Figure 1:
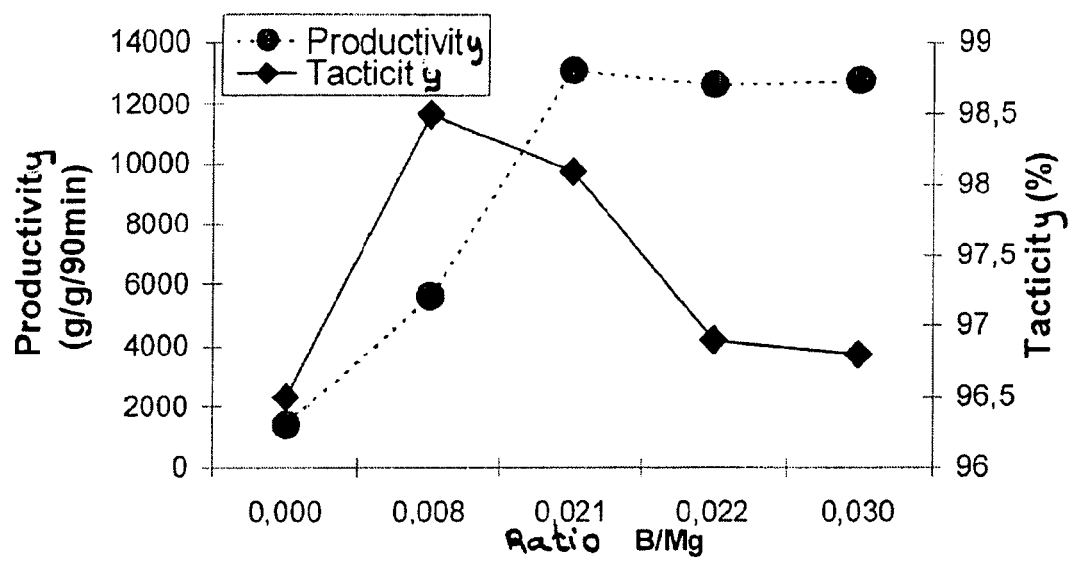

This application claims the benefit of PCT/EP2007/053289, filed Apr. 4, 2007, which claims the benefit of EP 06290629.2, filed Apr. 12, 2006.

This invention relates to an improved method for activating Ziegler-Natta catalyst systems and for controlling their behaviour.

Ziegler-Natta catalyst systems are multi-site catalyst systems that typically produce polymers having a mixture of chains having different tacticities, an heterogeneous composition and properties linked to crystallisation that are not optimal. A large effort was spent to improve the activity and tacticity of these catalyst systems. The last generations of Ziegler-Natta catalyst system have an excellent productivity and the addition of a Lewis base allows the selection of isospecific sites having a high isotactic index, but they still leave a diversity of sites, both in stereospecificity and in kinetic parameters.

Metallocene and post-metallocene catalyst system on the contrary are single site catalyst systems that produce often a narrow composition distribution and uniform crystallisation but these catalysts systems are costly and difficult to prepare.

In today's polymer production, the $MgCl_2/TiCl_4$ catalyst system is largely used to prepare polyethylene and polypropylene leaving a very limited part to metallocene catalyst systems.

Conventional Ziegler-Natta catalyst systems are typically based on $MgCl_2$, $TiCl_4$ and internal Lewis base or their precursors and they are activated with $AlR_3$ and eventually an external Lewis base.

It is thus very desirable to prepare Ziegler-Natta catalyst systems that offer some of the advantages of single site catalyst systems but are easier and less costly to prepare than the currently available single site systems.

It is an aim of the present invention to provide a method for activating Ziegler-Natta catalyst systems.

It is also an aim of the present invention to prepare modified Ziegler-Natta catalyst system having a controlled behaviour.

It is another aim of the present invention to produce modified Ziegler-Natta catalyst systems that have and keep a good activity.

It is yet another aim of the present invention to prepare modified Ziegler-Natta catalyst system for preparing polypropylene having a good tacticity.

The present invention reaches, at least partially, one or more of these aims.

Accordingly, the present invention provides a method for either improving the activity of a finished and active Ziegler-Natta catalyst system or for activating a Ziegler-Natta pre-catalyst component by adding a Lewis acid that is a metal compound soluble in apolar solvents.

In a preferred embodiment, the present invention provides a method for activating a Ziegler-Natta pre-catalyst component that comprises the steps of:
a) providing a Ziegler-Natta pre-catalyst component;
b) optionally extracting a fraction of the titanium sites by thermal treatment for instance under vacuum;
c) treating the pre-catalyst by adding a Lewis acid $BX_3$ that is a boron compound soluble in apolar or polar solvents, preferably in apolar solvents, wherein X is halogen or alkyl group;
d) optionally further treating the Ziegler-Natta pre-catalyst component with a titanium compound $TiX_4$ before or after step c);
e) adding aluminium alkyl of general formula $AlR_nZ_{3-n}$ wherein R is alkyl group having from 1 to 10 carbon atoms, Z is halogen and n is 0, 1, 2 or 3;
optionally adding an external electron donor $SiR^a{}_m(OR^b)_{4-m}$ wherein $R^a$ and $R^b$ are each independently selected from alkyl, aryl, cycloalkyl, arylalkyl or alkylaryl having at most 12 carbon atoms, and two neighbouring R's can be linked together to make a ring, and m is 0 or an integer from 1 to 4.

In this invention, the Ziegler-Natta pre-catalyst is meant to be a ready-to-use catalyst component. It comprises magnesium, titanium and enough chlorine to fully chlorinate Mg and Ti into $MgCl_2$ and $TiCl_4$. It further includes internal electron donor(s) that comprise at least two distinct oxygen-containing functions. Suitable internal electron donors can be selected for example from di-esters such as phthalate and succinate or from di-ethers.

Preferably X is Cl, Br, F or $C_2H_5$, more preferably it is Cl.

New internal Lewis bases such as gamma-diethers can also be used as external Lewis base and as external electron donors. They are represented by general formula

R'O—(CH2—CR$^1$R$^2$—CH2)—OR' wherein each R', $R^1$ and $R^2$ are each independently selected from alkyl, aryl, cycloalkyl, arylalkyl or alkylaryl having at most 12 carbon atoms and $R^1$ and $R^2$ can be linked together to make a ring or rings. Preferably both R' are the same and are CH3. Among preferred $R^1$ and $R^2$ one can cite isobutyl or cyclopentyl. Preferred gamma-diether is fluorenyl-based diether.

The further optional pre-catalyst treatment with $TiX_4$ always brings a further improvement of activity but the main improvement is caused by the addition of $BX_3$.

In another, less preferred embodiment, the present invention provides a method for improving the activity of Ziegler-Natta catalyst systems that comprises the steps of:
a) providing an active Ziegler-Natta catalyst system;
b) adding a Lewis acid $AX_v$ that is a metal compound soluble in apolar solvents, wherein A is selected from group 13, 14 or 15 of the Periodic Table and wherein X is halogen or alkyl group and v is the valence of A.

The method according to the present invention results in a substantial increase in the activity of the catalyst system as measured in amount of polymer produced per gram of catalyst system but in an even larger improvement of the activity as measured in amount of polymer produced per mole of titanium.

The addition of $BX_3$ to the Ziegler-Natta pre-catalyst has no adverse consequences on the polymers' properties.

LIST OF FIGURES

FIG. 1 represents the productivity of the modified Ziegler-Natta catalyst system of the present invention expressed in g of polymer per g of catalyst per 90 min and the tacticity expressed in % as a function of the amount of added Lewis acid expressed by the molar ratio A/Mg.

Figure 2:
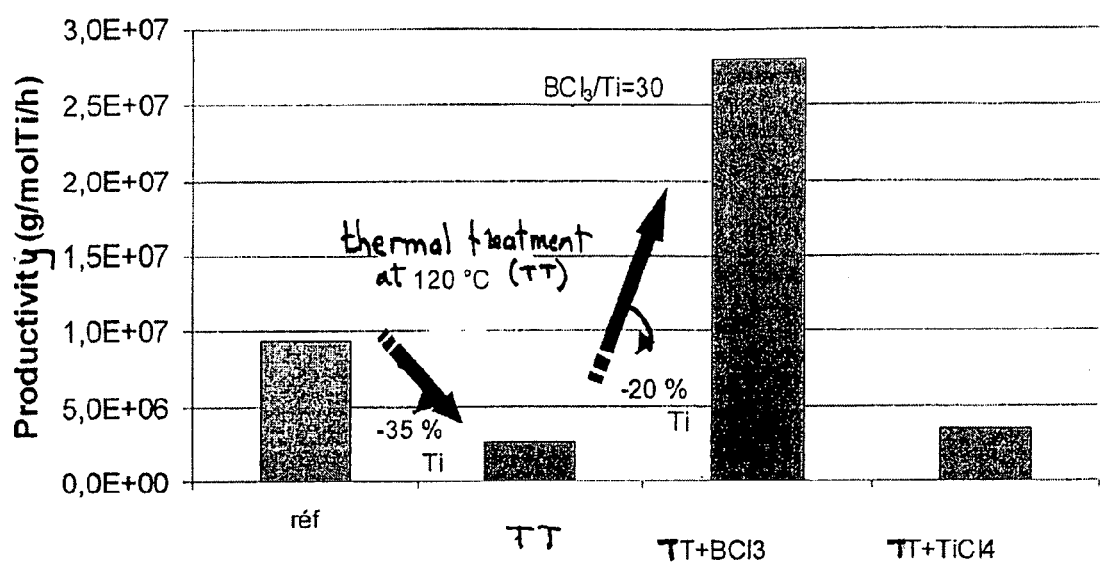

FIG. 2 represents the productivity, expressed in g of propylene homopolymer per g of catalyst per 90 minutes, respectively for an unmodified reference Ziegler-Natta (ZN) catalyst system, for the same ZN catalyst system thermally treated at a temperature of 120° C., for the thermally treated ZN catalyst further treated with $BCl_3$ at a temperature of 90° C. and for the thermally treated ZN catalyst further treated with $TiCl_4$ at a temperature of 90° C.

The optional thermal treatment is carried out either under vacuum or under inert gas such as helium, argon or nitrogen, at a temperature larger than 80° C., typically of from 80 to 150° C., preferably at a temperature of about 120° C. It is carried out under good vacuum, preferably of the order of $10^{-10}$ bars and for a period of time of from 2 to 6 hours, preferably of about 4 hours. Such treatment removes a fraction of the titanium sites; it does not remove the internal base and thus does not lead to any degradation of the catalyst component up to temperatures of 150° C. under good vacuum.

A Lewis acid may act as poison, when added either simultaneously with or after the activating agent, during the preparation of an active Ziegler-Natta catalyst system. It can also act as poison when used during polymerisation. Surprisingly, in the present invention, it acts as activator of the remaining titanium sites when added prior to the activating agent.

The Lewis acid $BX_3$ is a halogenated or alkylated boron compound that is soluble in apolar solvents, does not interfere with the internal Lewis base used to prepare the pre-catalyst, and is colourless. The most preferred Lewis acid is $BCl_3$. The size of and the oxidation state of metal B play a role on the distribution and activation of the active sites: several other metals have been tested such as Si and Sn but B had by far the best performance as activator. Similarly, other halogens or alkyl groups have been tested for X, but chlorine gives the best results: the activities obtained with various X can be ranked as follows: Cl>Br>F>Ethyl.

Optionally a double pre-treatment can be carried out with $TiX_4$ and $BX_3$ before adding the aluminium alkyl activating agent: it results in a further improvement of activity. Preferably, the pre-catalyst is treated with both $BCl_3$ and $TiCl_4$, added in any order, and with a molar ratio of (additional Ti)/(Ti Z-N precatalyst) of less than 1.

For example, treatment of the Ziegler-Natta pre-catalyst with $BCl_3$ improves the activity of the finished catalyst system by a factor of at least 2 with respect to the same untreated catalyst system. Treatment of the Ziegler-Natta pre-catalyst with $BCl_3$ and $TiCl_4$ improves the activity of the finished catalyst system by a factor of at least 3 with respect to the same untreated catalyst system.

Without wishing to be bound by a theory, it is believed that the Ziegler-Natta pre-catalyst consists of a combination of active titanium sites and of activating titanium sites. The thermal treatment removes part of the activating titanium sites. The subsequent Lewis acid treatment fills the vacated titanium sites with improved boron activating sites. It is also believed that the active titanium sites are not isolated but are found in aggregates of at least two titanium sites, wherein some active titanium sites may also be replaced by boron sites.

The finished pre-catalyst component is prepared according to methods well known in the art such as described for example in EP-728769 or WO03/076480 for diether-based catalysts or in US2003/0060581 for succinate- or phthalate-based catalysts. Typically, the amount of titanium in the finished pre-catalyst component is of from 1 to 4 wt %, preferably it is of the order of 2 wt %.

The Lewis acid $BX_3$ is preferably diluted in a convenient solvent and added to the pre-catalyst The compound is then heated from the starting temperature to a temperature of from 10 to 120° C., preferably to a temperature of from 20 to 100° C., more preferably to a temperature of about 90° C. and for a period of time of from 5 minutes to 4 hours, preferably 10 minutes to 2 hours. It is then dried at room temperature for a period of time of from 30 minutes to 3 hours, preferably of about 1 hour.

If the treatment with Lewis acid $BX_3$ is carried out for a long period of time of typically about 2 hours and at high temperature, typically of about 90° C., all types of Ziegler-Natta pre-catalysts show an improved activity in polymerisation.

If the treatment with Lewis acid $BX_3$ is carried out for a short period of time of from 10 to 30 minutes and at mild temperature of from 20 to 40° C., the Ziegler-Natta pre-catalysts prepared with phthalate internal Lewis base or with succinate internal Lewis base show improved activity when treated with $BX_3$ alone whereas those prepared with di-ether internal Lewis base do not show any improvement in activity when treated with $BX_3$ alone but have an improved activity when treated successively with $TiX_4$ and then with $BX_3$.

The amount of added Lewis acid $BX_3$ is preferably selected to have B/Mg ratio of less than 30. More preferably the ratio B/Mg is less than 5, most preferably it is less than 1. At such small levels of added Lewis acid, the activity is significantly increased and remains very high as a function of time. Larger amounts of Lewis acid produce a very high activity at the beginning of the polymerisation reaction followed rapidly by a sharp decrease of activity. Alternatively, the amount of Lewis acid can be given as a B/Ti ratio, but the amount of titanium is more variable as the thermal treatment removes titanium.

The temperature at which the treatment is carried out plays an important role in the productivity of the finished catalyst system: the higher the temperature, the higher the catalyst productivity.

The length of the treatment plays no significant role and the treatment can thus be limited to at most 2 hours without adverse consequences.

The productivity of the treated catalyst increases with decreasing concentration of Lewis acid $[BX_3]$ at constant value of the ratio B/Mg. It is thus preferred to work at concentration of $BX_3$ in the suspension of at most 0.1 mol/L, more preferably of at most 0.018 mol/L, and most preferably of about 0.001 mol/L.

The monomer pressure has a positive influence on the catalyst's productivity: the higher the pressure, the higher the productivity.

The present invention also discloses the active modified Ziegler-Natta catalyst system obtained by the method described hereabove.

The activating agent and external donor are those that are typically used with conventional Ziegler-Natta catalysts. The activating agent of formula $AlR_nZ_{3-n}$ is preferably aluminium alkyl, more preferably triethyl aluminium (TEA). The external electron donor is alkoxy-silane $SiR^a_m(OR^b)_{4-m}$, a more preferred being dicyclopentyldimethoxysilane (DCPDMS) or gamma-diether R'O—(CH2—CR$^1$R$^2$—CH2)—OR', a preferred gamma-diether being fluorenyl diether (BMMF).

The present invention further discloses a method for homo- or co-polymerising ethylene or alpha olefins that comprises the steps of:
  a) injecting the active modified Ziegler-Natta catalyst system into the reactor;
  b) injecting monomer and optional comonomer into the reactor;
  c) maintaining under polymerisation conditions;
  d) retrieving a polymer.

The polymerisation results show a spectacular improvement in activity without reducing the properties of the polymers. Maximum activity is observed for low B/Mg ratio. For example, excellent results are obtained for a B/Mg ratio of about 0.02 as seen in FIG. 1. It is thus important to note that in the present invention very little amount of boron is necessary to produce a very high activity. This is to be compared with the amount of aluminium, typically 100 fold larger, that is necessary to activate the catalyst.

The tacticity is also displayed in FIG. 1. It increases with increasing amounts of Lewis acid for small amounts of added acid corresponding to B/Mg ratio of up to about 0.01. Further addition of Lewis acid leads to a limited decrease of tacticity.

The preferred monomer is propylene and the preferred comonomers that can be used with the modified Ziegler-Natta catalyst system of the present invention, in the copolymerisation of propylene, are ethylene and hexene.

When ethylene is used as monomer, it is observed that much improved results are obtained with a Ziegler-Natta precatalyst that contain very small amounts of titanium, typically of from 0.1 to 0.3 wt %, based on the weight of the pre-catalyst component. Additional improvements are obtained if the pre-catalyst does not contain an internal Lewis base and if the activated $MgCl_2 \cdot xTHF$ support is dried under secondary vacuum in order to extract as much as possible of tetrahydrofuran (THF). The ratio $BX_3/Ti$ is preferably of the order of from 20 to 50. A ratio $BX_3/Ti$ larger than 50 leads to very high initial activities, followed by steep decrease.

EXAMPLES

Example 1

Propylene Polymerisation

A commercial Ziegler-Natta pre-catalyst prepared with a phthalate internal Lewis base was used as starting material.

The pre-catalyst underwent a thermal treatment under vacuum at a temperature of 120° C. and for a period of time of 4 hours that removed 35% of titanium. It was then treated with $BCl_3$ at a temperature of 90° C., for a period of time of 2 hours and with a B/Ti ratio of 30. This treatment removed an additional 20% of surface titanium. For comparison, to the same thermally treated material $TiCl_4$ was added instead of $BCl_3$ under the same conditions.

The starting catalyst (reference), the thermally treated catalyst, the $BCl_3$-treated catalyst and the $TiCl_4$-treated catalyst were all used in the polymerisation of propylene under the same conditions:
heptane: 500 mL
polymerisation temperature=70° C.
propylene pressure=4 bars added to maintain a constant pressure of 4 bars during the time of reaction
hydrogen pressure=0.1 bar
cocatalyst=TEA (3 mmol/L)
Al/Ti=250
external electron donor=DCPDMS (0.3 mmol/L)
The results are displayed in FIG. 2 that shows
that the productivity decreases substantially when the number of titanium sites is decreased by thermal treatment
that it increases dramatically when further treated with $BCl_3$
that not much happens when it is further treated with $TiCl_4$ instead of $BCl_3$.

The polypropylene obtained according to the present invention had a weight average molecular weight of the order of 350000 g/mol, a molecular weight distribution between 6.5 and 7, a melting temperature Tm of about 164° C. and an isotactic index (I.I.) of about 97%.

In this work, the molecular weights are determined by gel permeation chromatography (GPC), the molecular weight distribution is defined by the polydispersity index that is the ratio Mw/Mn of the weight average molecular weight Mw to the number average molecular weight Mn, the melting temperature Tm is determined by DSC calorimetry as measured at the peak of fusion and the isotactic index (I.I.) is the fraction of the total polymer produced insoluble in boiling heptane.

Example 2

The same polymerisation procedure as that described in example 1 was carried out, but the amount of $BCl_3$ was varied and the starting untreated pre-catalyst underwent thermal treatment. The results are summarised in Table I: they first show an increase in productivity with increasing amounts of $BCl_3$ followed by a plateau for values of the ratio $BCl_3/Ti$ larger than 1.

TABLE I

| $BCl_3/Ti$ | Prod. g/g/90 min | I.I. % | Tm ° C. | Mn g/mol | Mw g/mol | Mw/Mn |
|---|---|---|---|---|---|---|
| 0 | 1420 | 96.5 | 164.2 | 52500 | 302300 | 5.8 |
| 0.10 | 5600 | 98.5 | 163.7 | 49500 | 316600 | 6.4 |
| 1.0 | 13100 | 98.1 | 162.8 | 40300 | 293300 | 7.3 |
| 5.0 | 12730 | 96.8 | 162.4 | 37000 | 292000 | 7.9 |
| 31.0 | 12620 | 96.8 | 163 | 50200 | 313400 | 6.2 |

Example 3

Ethylene Polymerisation

The same pre-catalyst component, the same thermal treatment and the same $BCl_3$ treatment conditions as those of example 1 were used. The polymerisation conditions were as follows:
Heptane: 500 mL
Cocatalyst (TEA): 3 mmol/L
Al/Ti=250
Ethylene pressure: 6 bars
Hydrogen pressure: 2 bars
Temperature: 80° C.

The amount of $BCl_3$ was varied as indicated in Table II and the starting untreated pre-catalyst underwent thermal treatment. The results are also displayed in Table II.

TABLE II

| $BCl_3/Ti$ | Prod. g/g/90 min | Tm ° C. | Mn g/mol | Mw g/mol | Mw/Mn |
|---|---|---|---|---|---|
| 0 | 2920 | 134.0 | 25700 | 165600 | 6.4 |
| 0.1 | 3910 | 133.7 | 26000 | 104100 | 4.0 |
| 1.0 | 4580 | 133.9 | 25000 | 106100 | 4.2 |
| 5.0 | 4510 | 134.9 | 16100 | 97000 | 6.0 |

Example 4

Copolymerisation of Ethylene and Hexene

The same pre-catalyst component, the same thermal treatment and the same $BCl_3$ treatment conditions as those of example 1 were used. The polymerisation conditions were as follows:
Heptane: 300 mL
Cocatalyseur (TEA): 3 mmol/L
Al/Ti=250
Ethylene pressure: 4 bars
Hydrogen pressure: 1 bar
1-hexene: 80 mol % in the feed
temperature: 80° C.

The amount of $BCl_3$ used in the pre-catalyst was varied as displayed in Table III and the copolymerisation results are also displayed in Table III.

TABLE III

| B/Ti | B/Mg | Prod. g/g/90 min | Tm °C. | Mn g/mol | Mw g/mol | Mw/Mn |
|---|---|---|---|---|---|---|
| 0 | 0 | 2580 | 127.6 | 24100 | 132200 | 5.5 |
| 0.2 | 0.008 | 6320 | 128.8 | 19100 | 81900 | 4.3 |
| 0.61 | 0.021 | 13480 | 130.0 | 24000 | 107900 | 4.5 |
| 0.91 | 0.03 | 8490 | 128.5 | 17700 | 91500 | 5.2 |

Example 5

In this example, the same $BCl_3$ treatment was applied to pre-catalysts prepared with different internal Lewis bases (ILB). The treatment was as described in example 1 with a $BCl_3$/Ti ratio of 31. They were used to polymerise propylene using the polymerisation conditions of example 1. Their performances are compared in Table IV.

TABLE IV

| ILB | $BCl_3$/Ti | Prod. g/g/90 min | I.I. % | Tm °C. | Mw kg/mol | Mw/Mn |
|---|---|---|---|---|---|---|
| Phthalate | 0 | 5420** | 98.8 | 163.2 | 316 | 7.2 |
| Succinate | 0 | 4390** | 98.2 | 162.5 | 307.6 | 9.4 |
| γ-diether* | 0 | 8200** | 93.6 | 162.4 | 202.5 | 5.5 |
| Phthalate | 31 | 11950 | 97.5 | 162.7 | 340.13 | 7.7 |
| Succinate | 31 | 14180 | 96.9 | 162.4 | 352.5 | 9.9 |
| γ-diether | 31 | 12460 | 89.3 | 160.7 | 215.9 | 5.2 |

*no external Lewis base was used in this example.
**the productivity values are given for the thermally treated samples that have lost about 35% of titanium.

Example 6

In this example, the 3 pre-catalysts of example 5 were treated with increasing amounts of $BCl_3$, all other conditions being unchanged. The results are displayed in Table V.

TABLE V

| $BCl_3$/Ti | Prod. g/g/90 min | I.I. % | Tm °C. | Mw kg/mol | Mw/Mn |
|---|---|---|---|---|---|
| phthalate | | | | | |
| 0 | 5420 | 98.4 | 163.2 | 324.2 | 7.1 |
| 0.1 | 9960 | 97.9 | 162.8 | 335.1 | 7.2 |
| 0.25 | 10890 | 97.7 | 164.6 | 333.3 | 7.7 |
| 0.5 | 10970 | 97.0 | 163.5 | 344 | 8.2 |
| 1.0 | 10200 | 97.5 | 162.9 | 327.9 | 6.2 |
| 5.0 | 9780 | 98.0 | 163.1 | 338.4 | 7.7 |
| 31.0 | 11950 | 97.5 | 162.7 | 340.1 | 7.7 |
| succinate | | | | | |
| 0 | 4390 | 97.4 | 163.0 | 365 | 8.3 |
| 0.5 | 13250 | 96.8 | 162.5 | 376.3 | 8.6 |
| 1.0 | 14790 | 97.2 | 162.9 | 351.2 | 8.4 |
| 2.0 | 12320 | 97.3 | 163.8 | 311.7 | 7.5 |
| 31.0 | 14180 | 96.9 | 162.4 | 352.5 | 9.9 |
| γ-diether | | | | | |
| 0 | 8200 | 94.3 | 162.0 | 253.7 | 4.0 |
| 0.25 | 12160 | 93.7 | 160.6 | 158.4 | 3.5 |
| 0.5 | 13220 | 90.9 | 160.0 | 188.1 | 3.6 |

TABLE V-continued

| $BCl_3$/Ti | Prod. g/g/90 min | I.I. % | Tm °C. | Mw kg/mol | Mw/Mn |
|---|---|---|---|---|---|
| 0.75 | 13250 | 91.8 | 160.7 | 206.7 | 4.1 |
| 1.0 | 10760 | 91.5 | 160.4 | 192.5 | 3.5 |
| 2.0 | 10420 | 88.9 | 161.4 | 200 | 4.4 |
| 31.0 | 12460 | 89.3 | 160.7 | 215.9 | 5.2 |

It can be concluded that all types of pre-catalysts show that at first the productivity increases with increasing amount of BCl3, it reaches a maximum and then decreases slowly. The position of the maximum varies with the nature of the pre-catalyst.

Example 7

The polymerisation procedure of example 1 was repeated with the exception that the $BCl_3$ treatment temperature was varied. The results are reported in Table VI.

TABLE VI

| Treatment Temperature °C. | Production g/g/90 min | I.I. % | Tm °C. | Mw kg/mol | Mw/Mn |
|---|---|---|---|---|---|
| None* | 7550 | 98.0 | 164.1 | 318.2 | 7.5 |
| 20 | 11660 | 98.0 | 164.9 | 327.2 | 6.5 |
| 40 | 14740 | 97.7 | 162.8 | 245 | 5.3 |
| 60 | 15020 | 97.4 | 164.3 | 299.3 | 5.5 |
| 90 | 16250 | 97.9 | 162.1 | 316.6 | 6.4 |
| Heptane reflux | 16340 | 98.7 | 161.1 | 265.4 | 5.1 |

*none means no thermal treatment.

It can thus be concluded that the productivity of the catalyst initially increases rapidly with increasing treatment temperature up to a treatment temperature of about 60° C. For temperatures higher than 60° C. it keeps increasing but at a very slow rate.

Example 8

The polymerisation procedure of example 1 was repeated except that the concentration in $BCl_3$ was varied while maintaining a constant B/Ti ratio. The results are displayed in Table VII.

TABLE VII

| [$BCl_3$] mol/L | Productivity g/g/90 min | I.I. % | Tm °C. | Mw kg/mol | Mw/Mn |
|---|---|---|---|---|---|
| 0.001 | 16800 | 97.0 | 162.5 | 337.1 | 5.7 |
| 0.018 | 16250 | 97.9 | 162.1 | 316.6 | 6.4 |
| 0.1 | 14140 | 97.4 | 161.9 | 266.7 | 5.7 |

The results show that the productivity increases with decreasing concentration in $BCl_3$.

The polymerisation procedure of example 1 was repeated except that the propylene pressure was varied. The results are displayed in Table VIII.

TABLE VIII

| Propylene pressure bars | Production g/g/90 min | I.I. % | Tm °C | Mw kg/mol | Mw/Mn |
|---|---|---|---|---|---|
| 4 | 16250 | 97.9 | 162.1 | 316.6 | 6.4 |
| 8 | 29100 | 97.8 | 163.1 | 385 | 5.3 |

As expected, the catalysts's productivity increases with increasing propylene pressure.

Example 9

In this example, treatment of a phthalate-based pre-catalyst with $BCl_3$ was carried out under very mild conditions with a B/Ti ratio of 0.5. The activation and polymerization procedures was the same as in the other examples. The treatment conditions and polymerisation results are reported in Table IX.

TABLE IX

| Time min | Temp. °C | Production g/g/90 min | I.I. % | Tm °C | Mw kg/mol | Mw/Mn |
|---|---|---|---|---|---|---|
| — | — | 7550 | 98.0 | 164.1 | 318.2 | 7.5 |
| 10 | 20 | 12810 | 98.1 | 163.7 | 267.2 | 6.2 |
| 30 | 40 | 14390 | 98.3 | 163.3 | 253.7 | 6.2 |

These results confirm that the productivity increases with increasing temperature of the $BCl_3$ treatment. The duration of treatment is not very relevant.

Example 10

Several types of Ziegler-Natta pre-catalysts were submitted to mild treatment conditions: the pre-catalysts were not submitted to thermal treatment and were treated with $BCl_3$ during 10 minutes at a temperature of 70° C. They were then used to polymerize propylene under the following conditions:
500 mL of heptane
[TEA]: 3 mmol/L
[DCPDMS]: 0.3 mmol/L
Al/Ti=250 for phthalate- and succinate-based pre-catalyst and =160 for γ-diether-based pre-catalyst
Propylene pressure=4 bars
Polymerisation temperature=70° C.
Volume $H_2$=57 $cm^3$ for phthalate- and succinate-based pre-catalyst and =14 $cm^3$ for γ-diether-based pre-catalyst.
The results are reported in Table X.

TABLE X

| Pre-catalyst | B/Ti | Productivity g/g/90 min | I.I. % | Tm °C | Mw kg/mol | Mw/Mn |
|---|---|---|---|---|---|---|
| phthalate | — | 7550 | 98.0 | 164.1 | 318.2 | 7.5 |
| succinate | — | 4390 | 98.2 | 162.5 | 307.6 | 9.4 |
| diether | — | 8200 | 93.6 | 162.4 | 202.5 | 5.5 |
| phthalate | 0.5 | 12220 | 98.3 | 162.2 | 295.2 | 6.0 |
| succinate | 0.5 | 12220 | 98.3 | 162.3 | 310.6 | 9.4 |
| diether | 0.5 | 6400 | 92.8 | 160.8 | 211.2 | 4.5 |

With this type of treatment, it can be seen that the succinate-based pre-catalysts respond best to the treatment based.

The behaviour of the diether-based pre-catalysts was considerably improved when they were treated with $TiCl_4$ prior to the $BCl_3$ treatment as can be seen in Table XI.

TABLE XI

| Prior Treatment with $TiCl_4$ | Productivity g/g/90 min | I.I. % | Tm °C | Mw kg/mol | Mw/Mn |
|---|---|---|---|---|---|
| $(Ti_{add})/(Ti_{cata}) = 0$ | 6400 | 92.8 | 160.8 | 211.2 | 4.5 |
| $(Ti_{add})/(Ti_{cata}) = 0.25$ | 8200 | 92.4 | 164.1 | 202.7 | 4.1 |
| $(Ti_{add})/(Ti_{cata}) = 0.5$ | 8400 | 95.7 | 163.9 | 193.4 | 3.9 |

Example 11

In this example, the pre-catalyst has been treated sequentially with two different Lewis acids. The pre-catalysts were first treated with $BCl_3$ and then with $TiCl_4$. In all the cases studied, the addition of a further Lewis acid always produced an increase in productivity, but the main increase was always produced by the addition of $BCl_3$.

The phthalate-based pre-catalyst had an initial productivity of 7550 grams of polypropylene per gram of catalyst per 90 minutes. When treated first with $BCl_3$ (B/Ti=0.5) alone, the productivity was increased to 16250 grams of polypropylene per gram of catalyst per 90 minutes. When treated with $TiCl_4$ (Ti/Ti=0.5) alone, the productivity was of 8960 grams of polypropylene per gram of catalyst per 90 minutes.

When treated first with $BCl_3$ (B/Ti=0.5) and next with $TiCl_4$ (Ti/Ti=0.5), the productivity increased to 23600 grams of polypropylene per gram of catalyst per 90 minutes. Double treatment thus leads to the highest productivity.

The invention claimed is:

1. A method for activating a Ziegler-Natta pre-catalyst component comprising:
   providing a Ziegler-Natta pre-catalyst component, wherein the Ziegler-Natta pre-catalyst component comprises magnesium, titanium, an amount of chlorine sufficient to chlorinate Mg and Ti and form $MgCl_2$ and $TiCl_4$ and internal electron donor(s) that comprise at least two distinct oxygen-containing functions;
   submitting the pre-catalyst component to a thermal treatment carried out at a temperature of from 80 to 150° C. under vacuum better than $10^{-5}$ bars;
   treating the pre-catalyst component by adding a Lewis acid $BX_3$ that is a boron compound soluble in apolar solvents, wherein X is halogen or alkyl group;
   optionally further treating the Ziegler-Natta pre-catalyst component with a titanium compound $TiX_4$ before or after treatment with the Lewis acid;
   adding aluminium compound of general formula $AlR_nZ_{3-n}$ wherein R is alkyl group having from 1 to 10 carbon atoms, Z is halogen and n is 0, 1, 2 or 3; and
   optionally adding an external electron donor either of general formula $SiR^a{}_m(OR^b)_{4-m}$ or of general formula R'O—(CH2—$CR^1R^2$—CH2)—OR' wherein $R^a$ and $R^b$ are each independently selected from alkyl, aryl, cycloalkyl, arylalkyl or alkylaryl having at most 12 carbon atoms, and two neighbouring R can be linked together to make a ring, m is 0 or an integer from 1 to 4, wherein each R', $R^1$ and $R^2$ is independently selected from alkyl, aryl, cycloalkyl, arylalkyl or alkylaryl having at most 12 carbon atoms, and $R^1$ and $R^2$ can be linked together to make a ring or rings.

2. The method of claim 1, wherein X is Cl, Br, F or $C_2H_5$.
3. The method of claim 2, wherein X is Cl.
4. The method of claim 1, wherein the aluminum compound is an aluminum alkyl.
5. The method of claim 1, wherein a molar ratio B/Mg is of at most 30.

6. The method of claim 5, wherein the molar ratio B/Mg is of less than 1.

7. The method of claim 1 further comprising additional treatment with $TiX_4$ wherein X is halogen.

8. The method of claim 7, wherein a molar ratio of (additional Ti)/(Ti Ziegler-Natta precatalyst) is less than 1.

* * * * *